United States Patent [19]

Goldberg

[11] Patent Number: 5,754,739
[45] Date of Patent: May 19, 1998

[54] ADAPTIVE SYSTEM AND METHOD FOR CHOOSING A SELECTIVE CALL TRANSMITTER

[75] Inventor: Steven Jeffery Goldberg, Fort Worth, Tex.

[73] Assignee: Motorola, Inc., Schaumburg, Ill.

[21] Appl. No.: 649,358

[22] Filed: May 17, 1996

[51] Int. Cl.[6] .............................. G06F 17/00; G06G 7/00
[52] U.S. Cl. ............................ 395/61; 395/3; 395/900; 455/67.1; 455/103; 455/115
[58] Field of Search .............................. 455/67.1, 103, 455/115; 395/61, 3, 900

[56] References Cited

U.S. PATENT DOCUMENTS

| | | | |
|---|---|---|---|
| 4,670,906 | 6/1987 | Thro | 455/525 |
| 5,189,728 | 2/1993 | Yamakawa et al. | 395/51 |
| 5,280,630 | 1/1994 | Wang | 455/452 |
| 5,432,842 | 7/1995 | Kinoshita et al. | 455/440 |
| 5,444,820 | 8/1995 | Tzes et al. | 395/22 |
| 5,530,918 | 6/1996 | Jasinski | 455/525 |

OTHER PUBLICATIONS

G. Edwards and R. Sankar, "Hand–Off Using Fuzzy Logic," GLOBECOM '95. Communications for Global Harmony, IEEE Global Telecommunications Conference. vol. 1, pp. 524–528 Nov. 1995.

H. Maturino–Lozoya et al., "Pattern Recognition Techniques in Handoff and Services Area Determination," 1994 IEEE 44th Vehicular Technology Conference. vol. 1, pp. 96–100 Jun. 1994.

*Primary Examiner*—Tariq R. Hafiz
*Assistant Examiner*—Jason W. Rhodes
*Attorney, Agent, or Firm*—Charles W. Bethards

[57] ABSTRACT

A radio frequency manager (12) for choosing a selective call transmitter (20 or 25) among a plurality of selective call transmitters comprises a memory (13) for storing historical data on messages previously sent, the historical data comprising for each transmitter at least a latency measurement and a message queue profile and another memory (15) for storing pending messages, each of the pending messages having current information comprising at least an associated priority for the pending messages. The radio frequency manager further comprises a sorter (21) for classifying the historical data and the current information using fuzzy logic, wherein the sorter comprises a fuzzifier (14) for generating membership values, a rule base (16) for applying a set of predetermined rules to the current input conditions to perform a mapping with the historical conditions, and a defuzzifier (18) for generating a non-fuzzy prediction recommendation from the mapping for recommending the optimum transmitter.

18 Claims, 12 Drawing Sheets

Color Codes Transmitter Isolation

Receiver Transmitter Isolation

Page Latency

Page Priority

Other Transmitter Blocking

Probability of Success

FIG. 13

```
#{ Stage 1 logic
First calculate intermediary possibilities Intermediary results for
each transmitter:
    probability of success
    urgency
    system efficiency

#   BASED ON PROBABILITY OF SUCCESS
IF color_code is one_transmitter
        THEN probability_of_success is very_high;

IF color_code is several_transmitters AND retransmissions is low
        THEN probability_of_success is high;
IF color_code is several_transmitters AND retransmissions is some
        THEN probability_of_success is medium;
IF color_code is several_transmitters AND retransmissions is high
        THEN probability_of_success is low;

IF color_code is indeterminant AND receivers_isolate_xmitters
        is few THEN probability_of_success is medium;
IF color_code is indeterminant AND receivers_isolate_xmitters
        is many THEN probability_of_success is low;

#   URGENCY
IF priority is high OR latency is high THEN urgency is high;
IF priority is medium OR latency is medium THEN urgency is medium;
IF priority is low AND latency is low THEN urgency is low;

# SYSTEM EFFICIENCY
IF transmitter_utilization is high AND other_transmitter_blocking
        is low THEN efficiency is high;
IF transmitter_utilization is medium
        OR other_transmitter_blocking is NOT low
        THEN efficiency is medium;
IF transmitter_utilization is low OR other_transmitter_blocking
        is high THEN efficiency is low;

# In CubicCalc the above would have to be determined first.
# The outputs then are used as inputs to the following rules.
#}
```

Recommendation for a Transmitter

FIG. 15

\# \*\*\*\* Stage 2 Logic
IF probability_of_success is high AND urgency is high
   THEN recommendation is high;
IF probability_of_success is high AND urgency is NOT high
   AND efficiency is high THEN recommendation is high;
IF probability_of_success is high AND urgency is NOT high
   AND efficiency is NOT high THEN recommendation is medium;

IF probability_of_success is medium AND
   (urgency is high OR efficiency is high)
   THEN recommendation is high;
IF probability_of_success is medium AND urgency is NOT high
   AND efficiency is high THEN recommendation is medium;
IF probability_of_success is medium AND urgency is NOT high
   AND efficiency is NOT high THEN recommendation is low;

IF probability_of_success is low THEN recommendation is low;

\#{ FINAL SELECTION
 The above is called for each possible transmitter.
 The page is assigned to the transmitter queue with the highest recommendation.
 \#}

ADAPTIVE SYSTEM AND METHOD FOR CHOOSING A SELECTIVE CALL TRANSMITTER

RELATED APPLICATION

Ser. No. 08/649,559 being filed concurrently herein on May 17, 1996 by Goldberg et al., entitled "Method and Apparatus in a Radio Communication System for Assigning and Utilizing Sets of Transmitters."

FIELD OF THE INVENTION

This invention relates in general to contiguous logic and more specifically to use of contiguous logic in selecting an optimum selective call transmitter for transmission of information.

BACKGROUND OF THE INVENTION

Optimizing the selection of a selective call transmitter among a plurality of available selective call transmitters for transmission of information presents a complex task that would probably become a computational nightmare to accurately model. Selective call systems such as those found in two way radio frequency (RF) paging networks that take advantage of frequency reuse capabilities typically follow two steps. First, a broadcast page is made in a simulcast mode to all areas that a subscriber unit may reside in. Next, based on the information returned from the subscriber unit and the infrastructure receivers that detect the signals, a decision is made as to the single transmitter or group of transmitters to be used to send the bulk of the transmission. In real systems however, other factors influence and complicate the process. Real systems need to account for the numerous factors that make transmissions using one transmitter more advantageous over another transmitter. Additionally, there are many conflicting goals which affect the selection of a particular transmitter. Thus, a need exists for an adaptive system and method for choosing a selective call transmitter among a plurality of available selective call transmitters.

SUMMARY OF THE INVENTION

In a first aspect of the present invention, an apparatus for choosing a selective call transmitter among a plurality of selective call transmitters for use in the transmission of selective call messages comprises a memory for storing historical data on messages previously sent and a memory for storing a plurality of pending messages, each of the pending messages having current information comprising at least an associated priority for the appropriate sending of the pending messages. The apparatus further comprises a sorter for classifying the historical data and the current information so as to select an optimum transmitter among the plurality of selective call transmitters available for the next transmission of a selective call message.

In a second aspect of the present invention, a method for choosing a selective call transmitter among a plurality of selective call transmitters for use in the transmission of a plurality of selective call messages, comprises the steps of identifying a plurality of inputs for use in choosing a selective call transmitter, defining contiguous logic sets for each of the inputs identified, defining a contiguous logic set for the desired output, defining rules relating the contiguous logic sets for each input with the contiguous logic set for the desired output, maintaining statistics based on information received from the inputs, and executing the rules when a choice of one of the plurality of selective call transmitters is required based on the statistics maintained. Finally, the selective call transmitter is selected with the highest recommendation as determined by the rules.

BRIEF DESCRIPTION OF THE DRAWINGS

FIG. 13 is a linguistic rule-base for a first stage of the contiguous logic system in accordance with the present invention.

FIG. 15 is a linguistic rule-base for a second stage of the contiguous logic system in accordance with the present invention.

DESCRIPTION OF THE PREFERRED EMBODIMENT

Most contiguous logic systems use a rule-base as their central structure. Rules, typically cast in an if-then syntax, represent system operation, mapping inputs to outputs. Measured crisp input values are "fuzzified", using membership functions, into fuzzy truth values or degrees of membership. These are then applied as conditions to the rules contained in the rule-base, with triggered rules specifying necessary actions, again as fuzzy truth values. These actions are combined and "defuzzified" into crisp, executable system outputs. Where inputs and outputs are continuous (as in control applications), this fuzzify-infer-defuzzify process is performed on an ongoing basis, at regular sampling intervals. In summary, crisp inputs are measured and assigned fuzzy membership values as part of the fuzzification step, which are applied as conditions to the rules in the rule-base. The rules then specify what actions are to be taken, although in fuzzy terms. Fuzzy actions from typically two or more rules are combined and transformed back into executable system outputs.

Conceptually this process is similar to the use of a Fast Fourier Transform and its inverse to transform time domain signals into the frequency domain, to process the resulting frequencies, and then to transform the results back into the time domain. The added expense of transforming between time and frequency domains is justified because the system model is easier to understand and manipulate in terms of frequencies.

Similarly, a contiguous logic system "transforms" signals from the "crisp domain" to the "fuzzy domain", makes decisions based on these fuzzy values and knowledge of the desired system operation cast in fuzzy terms (rules), and then transforms the results back into the crisp domain for execution. The justification is, as with frequency domain processing, that the system model is easier to understand and manipulate in the fuzzy domain than in the crisp domain.

Figure 1:
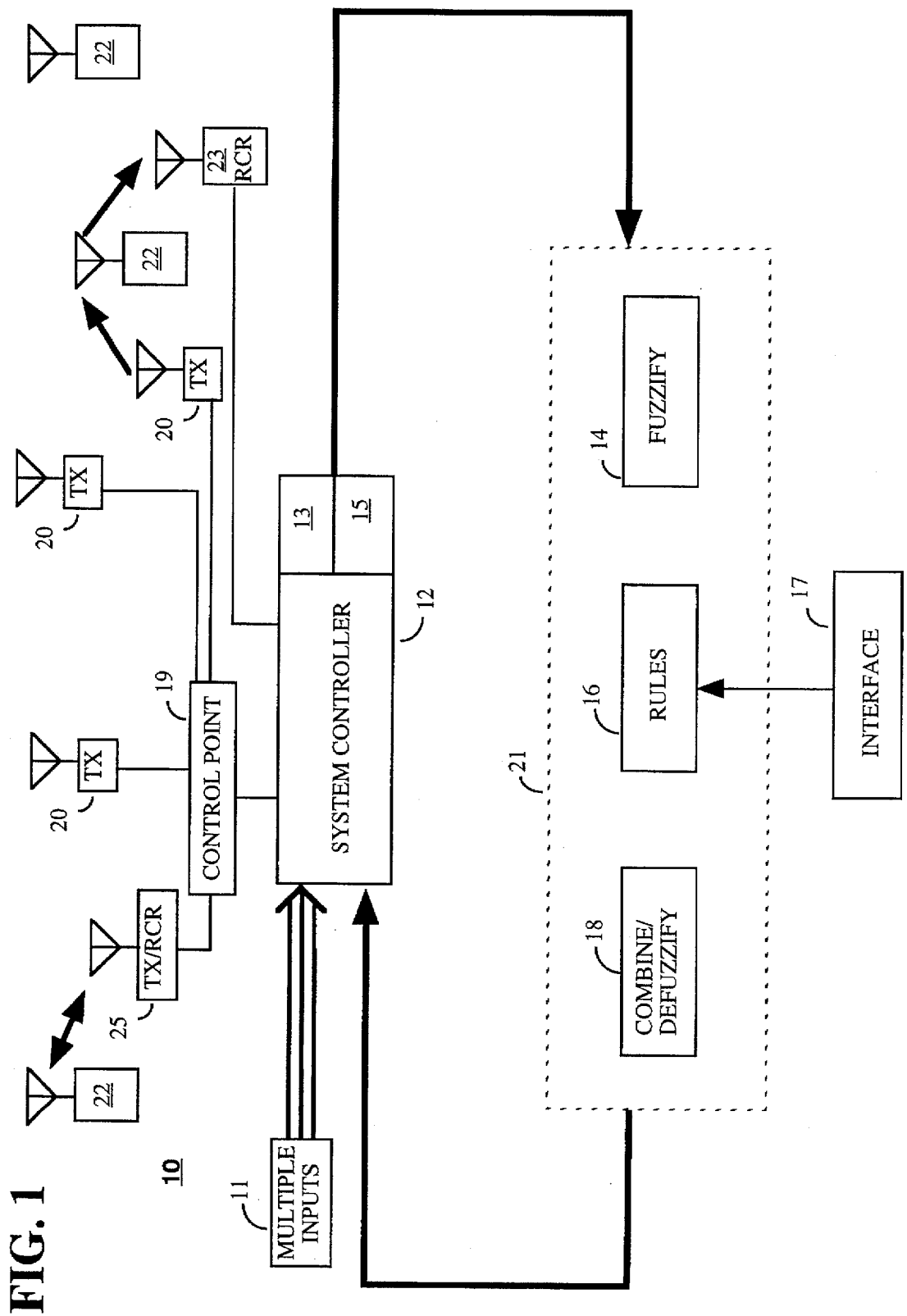
FIG. 1 is an adaptive system for choosing a selective call transmitter in accordance with the present invention.

This basic fuzzy rule-based structure can be used in choosing a selective call transmitter among a plurality of transmitters in a system for transmission of messages to a plurality of selective call transceivers 22. By allowing for flexibility in the definition of fuzzy logic operators, and especially in how action combination/defuzzification is performed, the breadth of application is even further increased. Referring to FIG. 1, an adaptive system 10 for choosing a selective call transmitter is shown in accordance with the present invention. The system 10 includes a system controller 12 or radio frequency manager that uses a contiguous logic controller 21 or sorter to determine which transmitter to use. The contiguous logic controller 21 or sorter preferably comprises a fuzzifier 14, a rule-based element 16 or inference engine and a defuzzifier 18. The sorter 21 preferably classifies historical data and current information so as to select an optimum transmitter among a plurality of transmitters available for the next transmission of the selective call messages and alternatively select a second optimum transmitter for the next transmission if the optimum transmitter is not available. Preferably, the fuzzifier 14 generates membership values for historical and current input conditions while the rule-based element 16 applies a set of predetermined rules of the current input conditions to perform a mapping with the historical conditions. The defuzzifier 18 preferably generates a non-fuzzy predicted recommendation from the mapping, and for generating the optimum transmitter or alternatively for generating a second optimum transmitter. The contiguous logic controller or sorter 21 simplifies the decision making process for the system controller 12 in determining whether to choose one transmitter or another for transmission of a message through one of the plurality of transmitters (20 and 25) shown. It should be appreciated that in some systems the transmitters 20 and 25 can each respectively transmit a plurality of independent messages on a plurality of communication channels at the same time and that the use of "transmitters" herein contemplates use of such transmitter units that simultaneously transmit messages on multiple frequencies or channels. For example, a single four-channel transmitter unit should be treated the same as four separate "transmitters" for the purposes of this document. The sorter 21 uses the fuzzifier 14 as an input processing element for receiving biases for latency, priority, color code transmitter isolation, fixed base receiver isolation, frequency, transmitter utilization, retransmissions, and transmitters blocking among other biases. The sorter 21 uses the defuzzifier 18 as an output processing element for outputing the optimum transmitter and finally, the rule-based element 16 is used as an intermediate processing element for coupling the input processing element with the output processing element. Additionally, the system 10 includes an operator to modify the rule-based element 16 and further preferably provides for built-in limits to prevent such modifications from exceeding safe guarded situations. The modifications can be achieved using a graphical input such as the interface 17 shown in FIG. 1.

The radio frequency manager or system controller 12 preferably comprises a first memory 13 for storing historical data on messages previously sent, the historical data comprising for each transmitter can include measurements for latency and priority trends, color code transmitter isolation, fixed base receiver isolation, transmitter utilization, retransmissions, transmitters blocking as well as message queue profiles. Of course, other historical data can be tracked as suitably required. The radio frequency manager or system controller 12 also preferably comprises a second memory 15 for storing a plurality of pending messages, each of the pending messages having current information comprising at least an associated priority for the sending of the pending messages, but may include other required current status information. The current information and messages having the associated characteristics can be viewed as the multiple inputs 11 shown in FIG. 1.

Operationally, once a new message is received and accounted for by the system controller 12 and the sorter or contiguous logic controller 21 has provided the appropriate recommendation in accordance with the rule-based element 16, a control point 19 directs which of the plurality of transmitters 20 (or transceiver 25) are to transmit a given selective call message. Other data including knowledge of the location or relative location compared to existing transmitter sites of existing infrastructure receivers such as fixed base receiver 23 or the receiver portion of transceiver 25 can be used by the system 10 to enhance the performance and decision making in selecting a particular transmitter.

Figure 2:
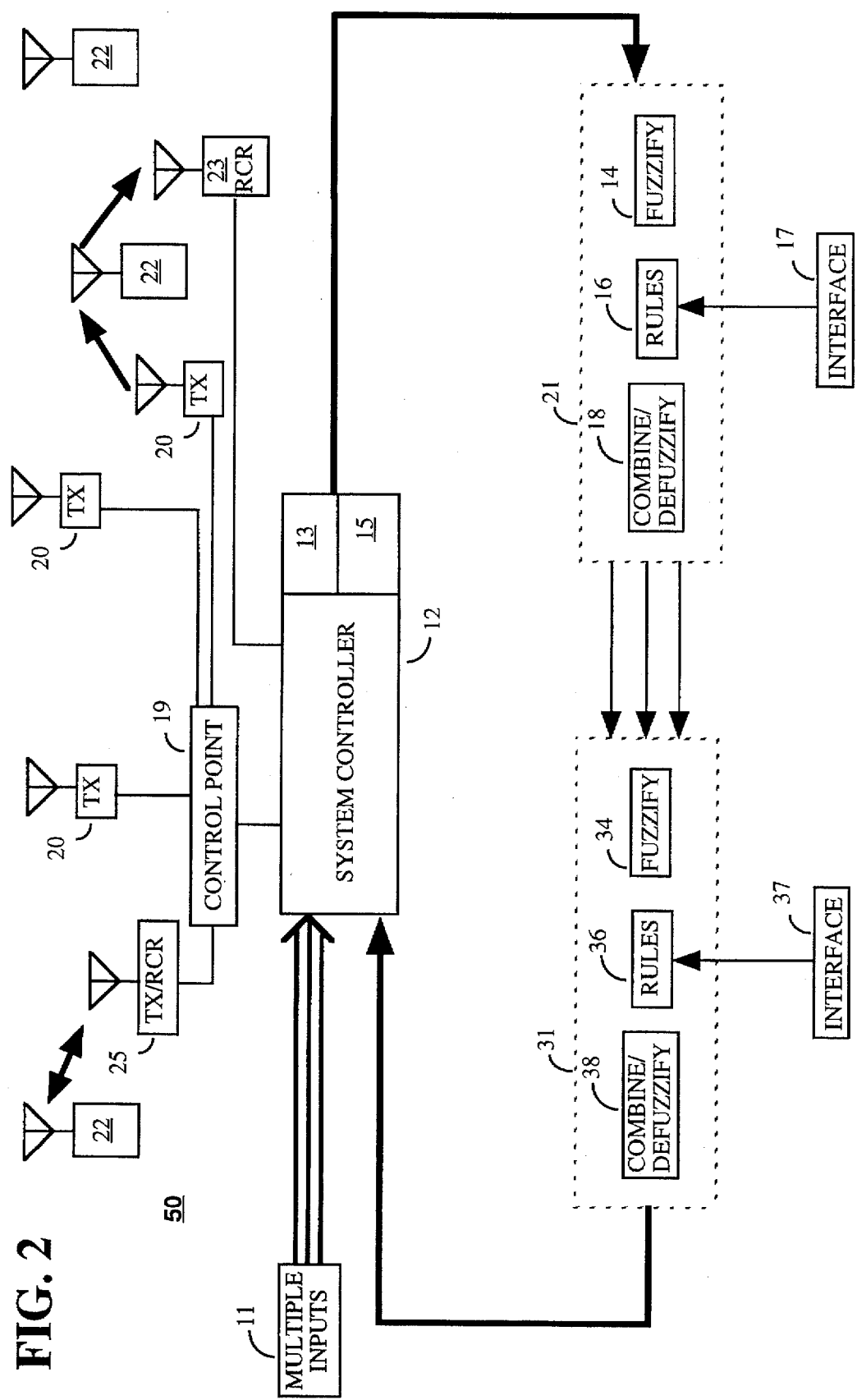
FIG. 2 is another adaptive system for choosing a selective call transmitter in accordance with the present invention.
Figure 10:
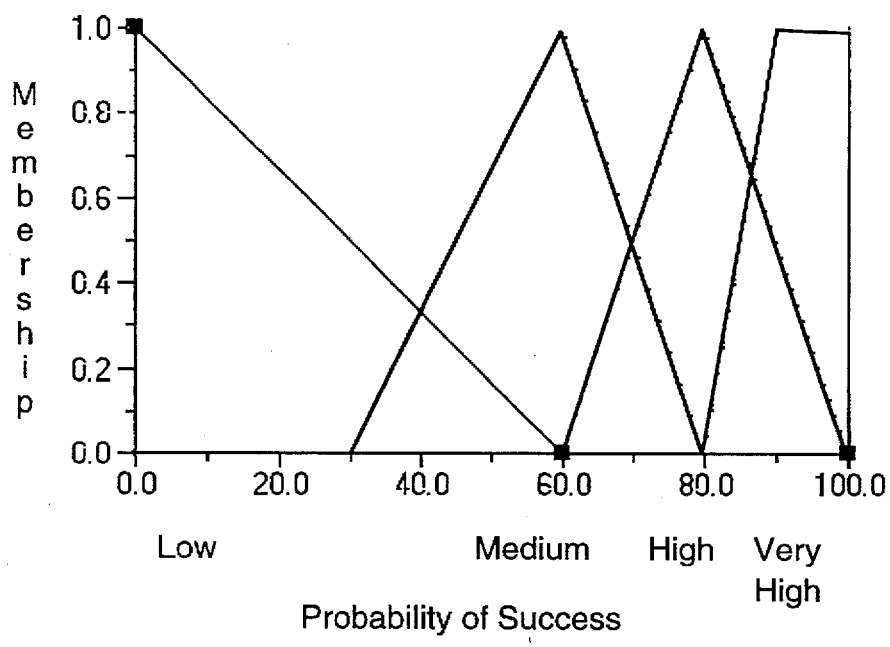
FIG. 10 is a plot of an membership function for probability of success in accordance with the present invention.
Figure 11:
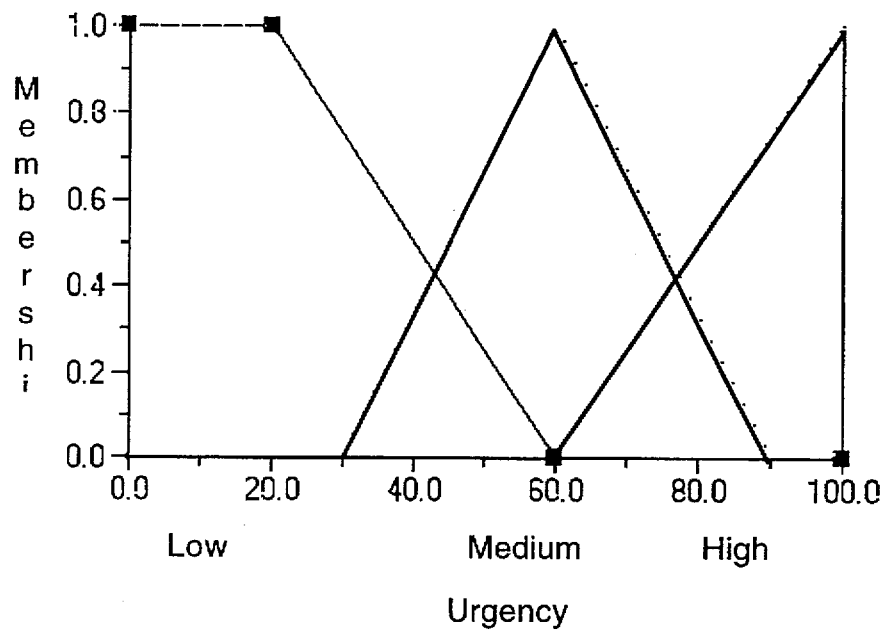
FIG. 11 is a plot of an membership function for urgency in accordance with the present invention.
Figure 12:
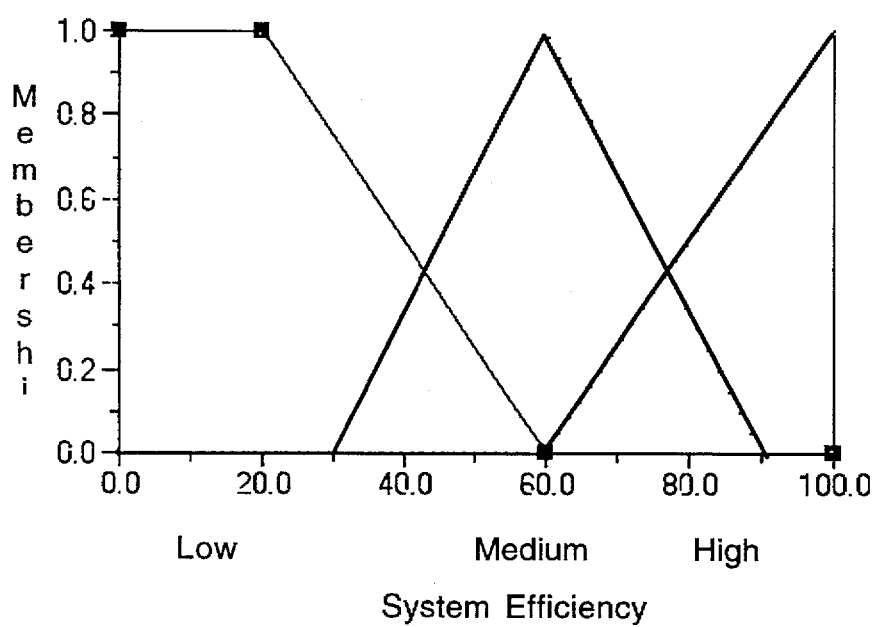
FIG. 12 is a plot of an membership function for system efficiency in accordance with the present invention.

FIG. 2 shows an alternate embodiment of the present invention with an adaptive system 50 which is substantially similar to the system 10 of FIG. 1, except that the contiguous logic operations are done in two stages. This is particularly advantageous where there are many inputs to consider. An intermediary stage would simplify the overall processing and modelling of the entire operation. In this instance multiple inputs 11 such as color code, retransmissions, receiver isolation from transmitters, priority, latency, transmitter utilization, and "other transmitter blocking" (see FIG. 13) could be among the many inputs received at the contiguous logic controller 21 of FIG. 2. This contiguous logic controller would operate much the same as the controller 21 of FIG. 1, except the rules 16 (see FIG. 13) would provide 3 separate outputs from a first stage as opposed to one output. In system 50, the three outputs are categorized into "probability of success", "urgency" and "system efficiency" and serve as three separate inputs for a second stage of the operation embodied in the contiguous logic controller 31. Once again, the contiguous logic controller 31 contains the same essential elements found in contiguous logic controller 21 except for the linguistic rule base found in FIG. 1, which provides for a single discrete output and the use of the membership functions found in FIGS. 10, 11, and 12. The contiguous logic controller 31 or sorter preferably comprises a fuzzifier 34, a rule-based element 36 or inference engine and a defuzzifier 38. Additionally, the system 50 can include an operator to modify the rule-based element 36 and further preferably provides for built-in limits to prevent such modifications from exceeding safe guarded situations. The modifications can be achieved using a graphical input such as the interface 37.

FIGS. 3–9 show plots of membership functions for different characteristics or factors that are used in the fuzzifier 14 to determine a degree of membership given a crisp input value. Measured crisp input values are "fuzzified", using membership functions, into fuzzy truth values or degrees of membership. For instance, a color code transmitter isolation measurement of 45%, would have a degree of membership of 0..2 in the set "Indeterminant" while also having a degree of membership of 0.7 in the set "Several Transmitters" in accordance with the membership function shown in FIG. 3. These are then applied as conditions to the rules contained in the rule-base of FIG. 13, with triggered rules specifying necessary actions, again as fuzzy truth values. For instance, see rule stating "IF color_code is several_transmitters AND retransmissions is low THEN probability_of_success is high." This along with other actions are combined and "defuzzified" into crisp, executable system outputs.

More specifically, there could be a number of transmitters within a given system each having different characteristics which can influence their efficiency, and the efficiency of the selective call receivers or transceivers they are signaling. These transmitters often must coexist on the same network, with time allocated for each one's operation in a manner which optimizes its particular requirements. They can have in common among other things the factors of color code transmitter isolation, fixed receiver isolation of transmitters, page latency, page priority, transmitter utilization, blocking of busy transmissions, prior success or failure, the number of retransmissions, probability of success, urgency, and system efficiency. Many of these factors are further described below, but one ordinarily skilled in the art should realize there could be many other factors that could used. In the case where there are many inputs, a multiple stage process could be used to simplify the process. In this case, some of the many inputs could be fuzzified and defuzzified in a first stage to provide three discrete outputs for probability of success, urgency and system efficiency as shown in FIG. 2. In a second stage, the three previous outputs are used as "inputs" that are fuzzified and defuzzified using the rules outlined in FIG. 15. These "inputs" also have their respective membership functions shown in FIGS. 10, 11 and 12. This two stage fuzzification/ defuzzification is used to simplify the computation involved with numerous inputs and further stages could be used as required to simplify the process. But a single stage version using many inputs could also be implemented in accordance with the present invention as shown in FIG. 1.

Figure 3:
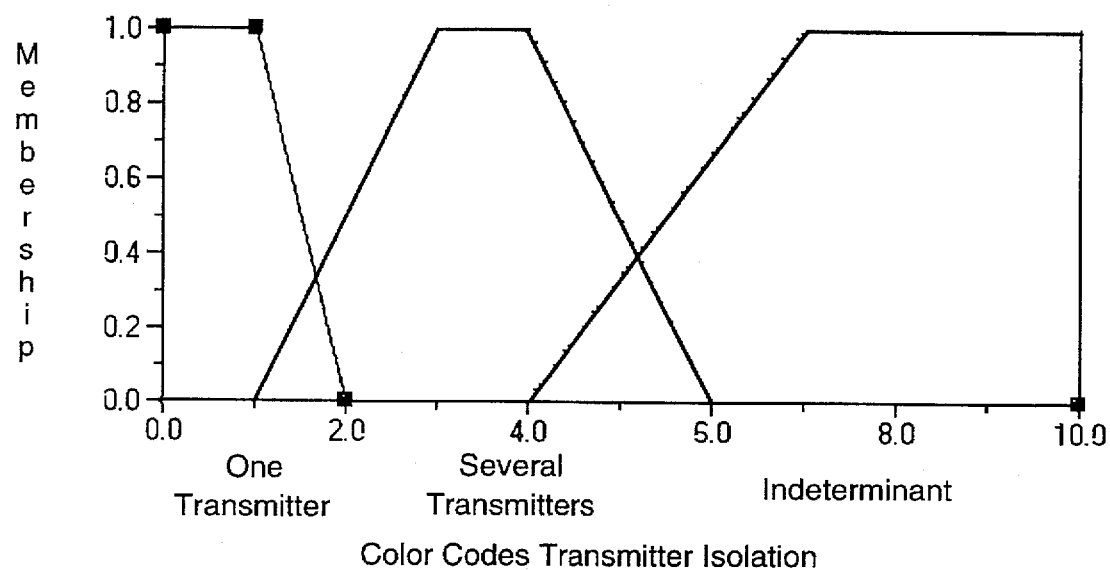
FIG. 3 is a plot of a membership function for color code transmitter isolation in accordance with the present invention.

The membership function for Color code transmission isolation can generally be grouped into three different sets as shown in FIG. 3. If the color code was received without errors and/or there were no uncorrectable bits detected, the given transmitter would be the best to deliver a page. Thus, such a transmitter would fall under the "indicates one" set. If a few uncorrectable bits were received, it could be due to a cluster of transmitters. Unless there is a high noise figure, the errors are probably due to bit collisions. The pager is therefore probably within range of several transmitters, but not significantly one more than another. Thus, this set would be considered "isolated to a few." Finally, a transmitter falls within the "indeterminant" set when there is a likely noise figure problem. In such a case, color codes can not be used to determine transmitter usage.

Figure 4:
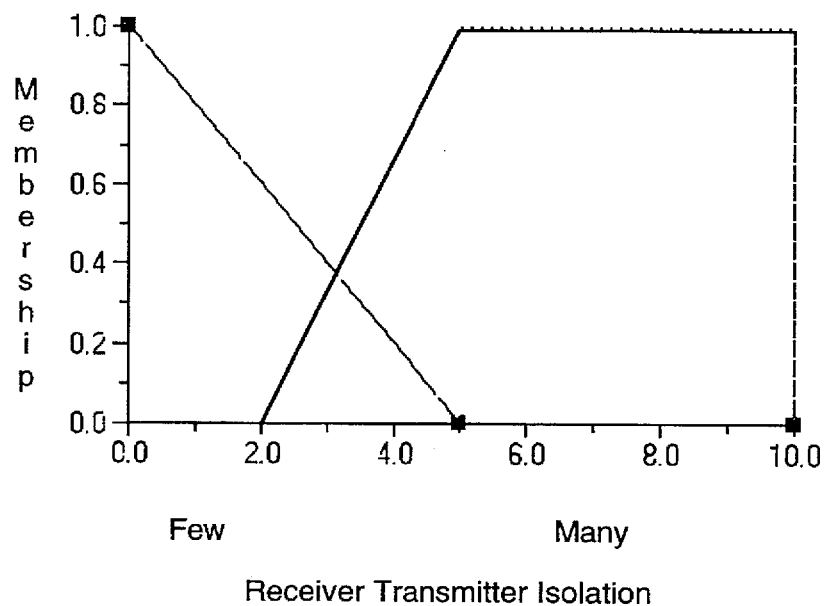
FIG. 4 is a plot of a membership function for receiver transmitter isolation in accordance with the present invention.

Fixed receiver isolation of transmitters can be categorized into two sets: Either "few" or "many" as shown in FIG. 4. Isolation of transmitters from fixed receivers provides sets of transmitters that are capable of reaching portable subscriber units. The higher the membership in the "FEW" category, the higher the probability of selecting a small set of transmitters that can successfully transmit to the portable subscriber unit. Conversely, the "MANY" category decreases the potential robustness of the receiver information. This is reflected in FIG. 13's "BASED ON PROBABILITY OF SUCCESS" rules. In other words, this reflects the situation where the existence of few base receivers around a particular transmitter can easily be used to isolate such transmitter and where the existence of many base receivers around a particular transmitter creates problems in isolating or identifying a particular transmitter.

Figure 5:
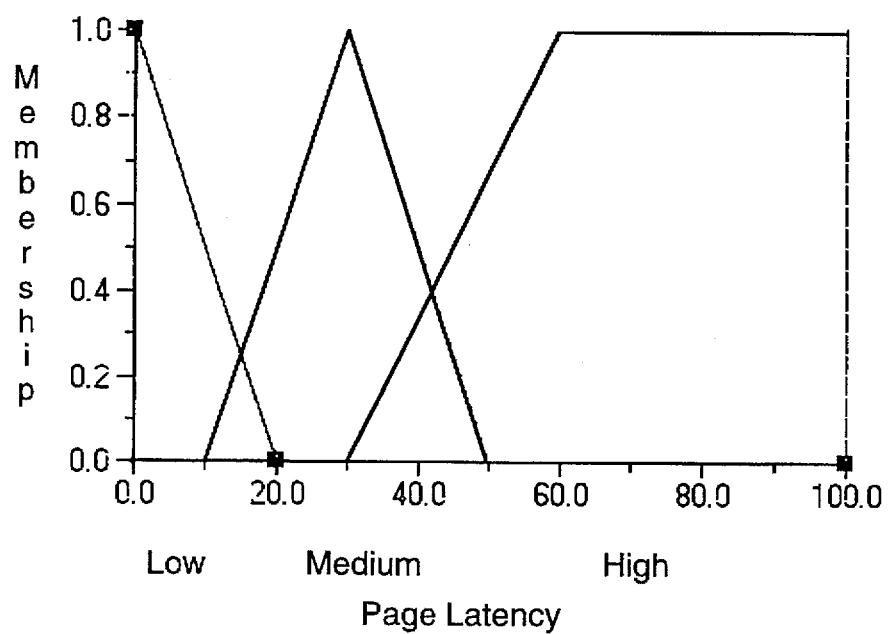
FIG. 5 is a plot of a membership function for page latency in accordance with the present invention.

With respect to latency, pages or messages can become old and stale. Those sent with the idea of immediately conveying information, can be of decreasing value as they are delayed in the system. In some cases this can cause additional traffic in a system as people reinitiate a page, believing a page has been missed or ignored, when in fact it may not as of yet left the system. In extreme cases (examples: medical & fire) their delay can actually be life threatening. FIG. 5 is a plot of a membership function reflecting latency in accordance with the present invention.

Figure 6:
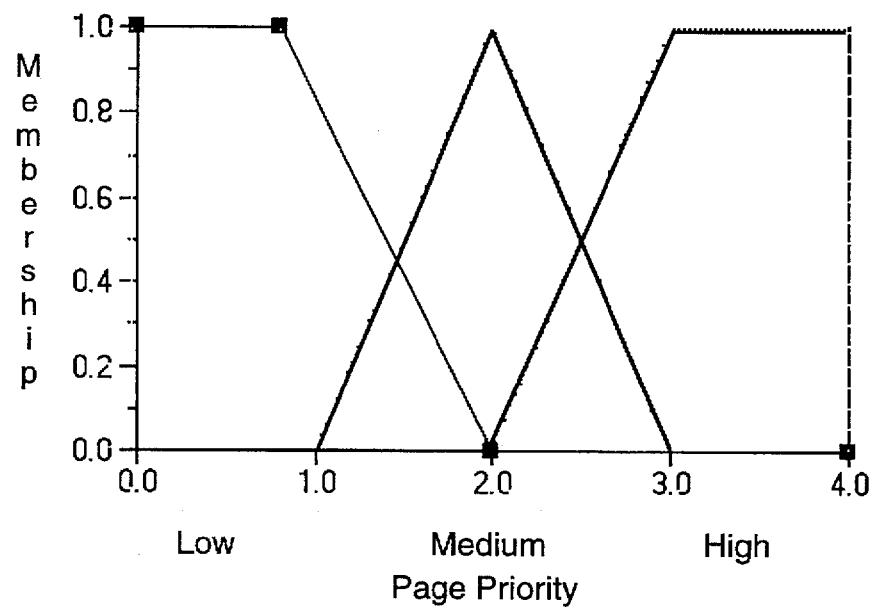
FIG. 6 is a plot of a membership function for page priority in accordance with the present invention.
Figure 7:
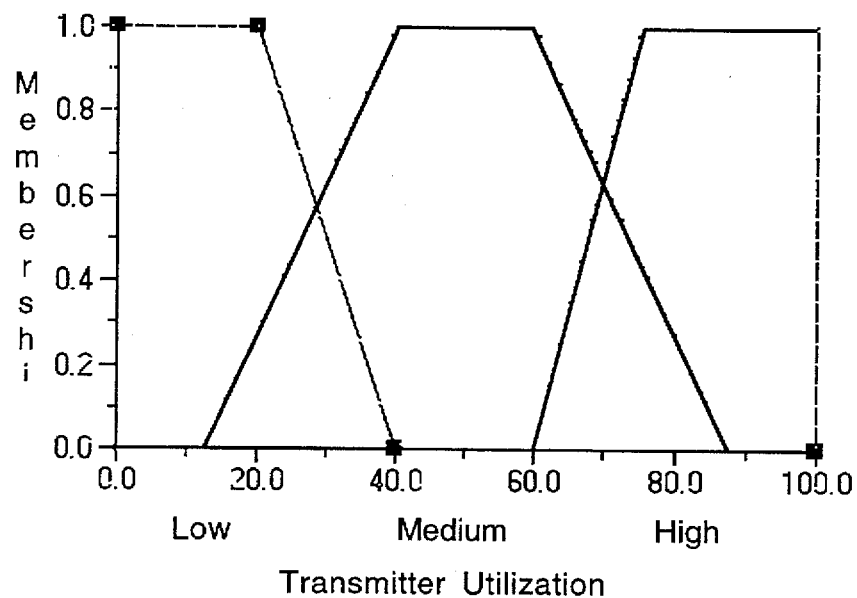
FIG. 7 is a plot of a membership function for transmitter utilization in accordance with the present invention.
Figure 8:
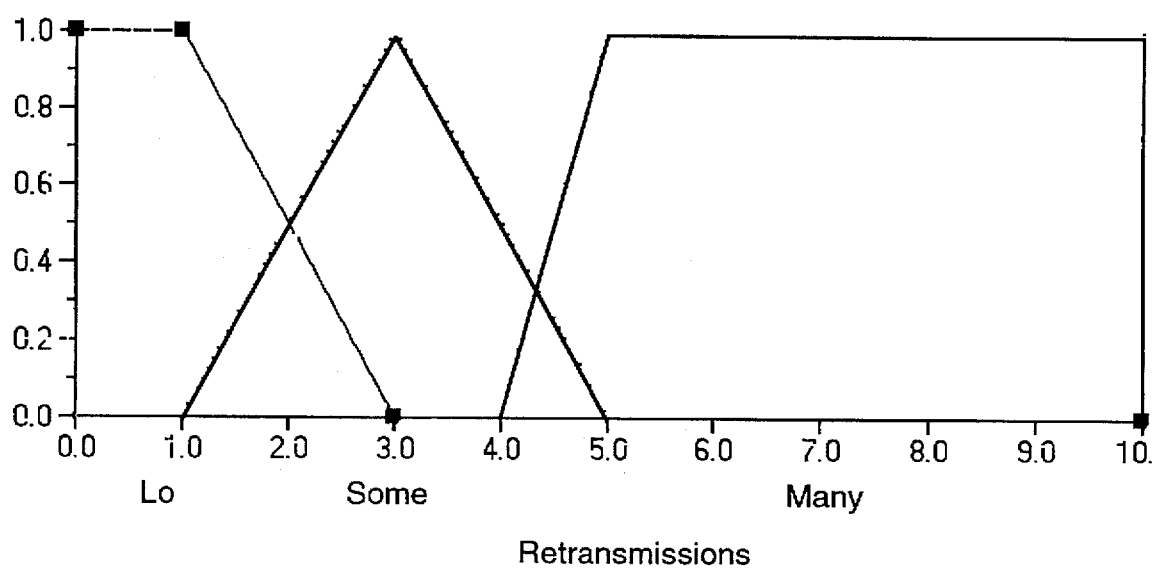
FIG. 8 is a plot of a membership function for retransmissions in accordance with the present invention.
Figure 9:
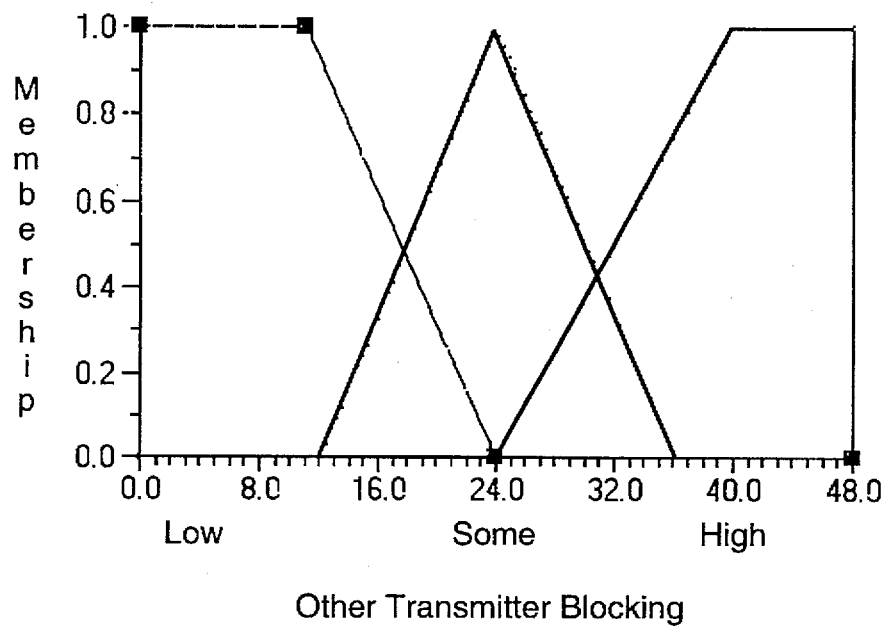
FIG. 9 is a plot of an membership function for other transmitters blocking in accordance with the present invention.

With respect to priority, the relative importance of a page can be entered into a system as a priority level. FIG. 6 is a plot of a membership function reflecting Priority in accordance with the present invention. Messages with higher priorities should in general be sent prior to lower ones. This may not always happen however, even in efficient systems. If a particular priority page defines the other pages to be sent, a lower priority may be blocked, while still lower priority pages which are not blocked are sent. Preemptive priority (same examples as extreme latency cases) are a special case causing most other paging rules to become invalid until the page is sent.

The membership functions for page latency, page priority, number of transmissions, blocking of busy transmissions (see FIG. 8), prior success or failure and transmitter utilization (see FIG. 7) can typically be categorized into the sets of "high", "medium" and "low." Likewise, as used as inputs to a second stage as shown in FIG. 2, the the membership functions for probability of success, urgency, and system efficiency can generally be categorized into sets of "high", "medium" and "low." As stated before, the three outputs of the first stage are the inputs for the second stage.

Figure 14:
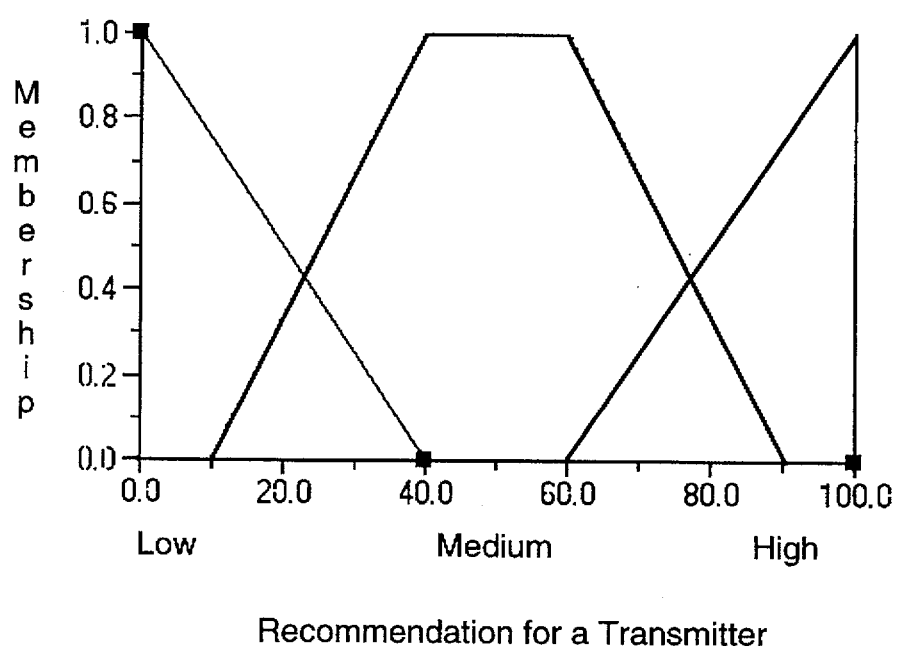
FIG. 14 is a plot of an output function for recommending a transmitter in accordance with the present invention.

As an example, probability of success can be based on the inputs of color codes, retransmissions, and receivers isolation from transmitters. Urgency can be based on priority and latency. System efficiency can be based on the inputs of transmitter utilization and other transmitters blocking. System efficiency is a key factor for service providers since servicing as large a volume of paging traffic as possible would maximize their profits. Also, reuse of transmitters becomes a very significant issue when systems approach capacity. In any event, these three outputs from the first stage operate as inputs to a second stage and preferably provide a membership function for the output of stage 2 titled "Recommendation for a Transmitter" as shown in FIG. 14. Thus, the system would use the transmitter with the "highest" recommendation to transmit a particular selective call message.

Considering all the above tradeoffs in an all inclusive, adaptive manner is a nontrivial task. The exact definitions and relative importance of factors can vary amongst customers. In fact a service provider can find it difficult to define their own biases given the need to satisfy all customer requirements, regardless of their conflicting implications.

Over time the situations considered optimum also change. This can be because of a better understanding of the system's operation and/or customer's needs. Present paging transmitter management systems are optimized towards one type of scenario. If the customer wants modifications, the product manufacturer must explicitly redefine its operation to the new goals.

The ideal system would take into account all the previous requirements in a form that is easy to understand and adjust, yet is robust and extensible. The present invention can closely approach the ideal system having sufficient inputs. The embodiment disclosed only considers several inputs. As seen, the invention is easily extensible to consider an arbitrary number of different inputs.

Using the approach of the present invention would require at least defining some of the contiguous logic sets for each of the inputs shown in FIGS. 3–9. A rule base (not shown) could be defined to account for all these inputs at a single instance and a contiguous logic set for a highest "recommendation" to use a particular transmitter can be defined which serves as an output set as shown similar to FIG. 14. System 10 of FIG. 1 illustrates a single stage contiguous logic system which would probably have a more complicated rule base than the rule base for System 50. Preferably, though, when using a relatively large number of inputs, the process and defined rules can be simplified by breaking the operation into stages. In this instance, the embodiment disclosed in FIG. 2 and FIGS. 3–17 represents a 2 stage contiguous logic operation, although one ordinarily skilled in the art can appreciate that such a system can be done in 1 stage or many stages. The rules are then defined relating the inputs to the output set or sets. Preferably, the rules are easily defined linguistically as shown in FIGS. 13 and 15. The rules are then executed based on the statistics as they exist at each transmitter choosing. Whichever transmitter has the higher "recommendation" determines the choice of the transmitter used to transmit a particular message. Alternatively, the rules can be defined in other forms other than linguistically. For instance, the rules could be defined as a matrix of sets or the rules could utilize a neural net (see *Neural Networks and Fuzzy Systems*, by Bart Kosko 1992) to refine the rules as the system operates in a real setting. Contiguous logic systems use neural systems to learn fuzzy rules from examples or to tune the rules. The net learns the fuzzy rules by adapting its dynamic structure. The rules emerge as the equilibrium states of the neural dynamic system. One ordinarily skilled in the art will appreciate that the embodiments described and the linguistic rules disclosed are merely exemplary and that variations and modifications can be made within the scope and spirit of the present invention as defined by the appended claims.

Figure 16:
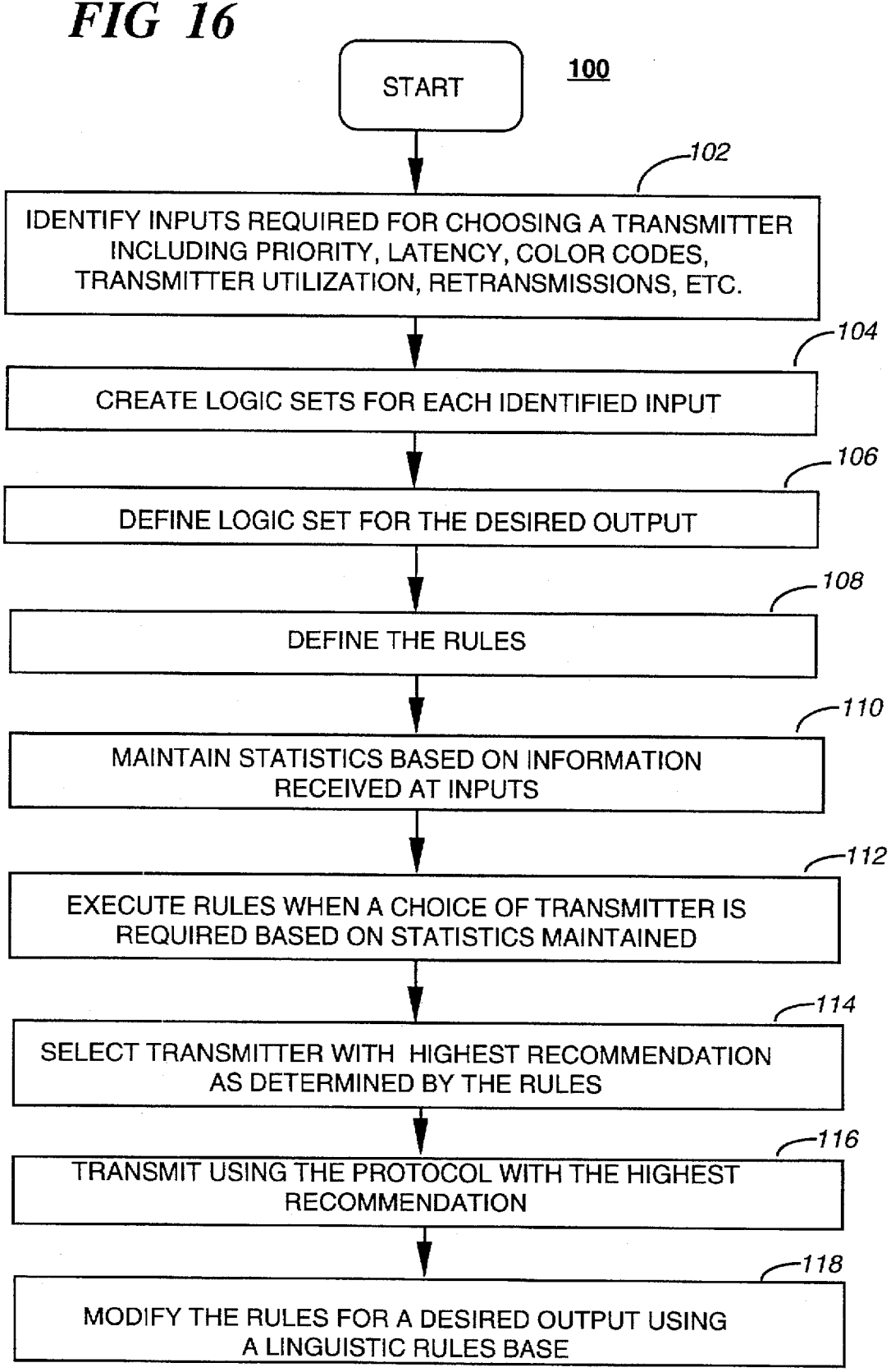
FIG. 16 is a flow chart of a method of choosing a selective call transmitter in accordance with the present invention.

FIG. 16 illustrates a flow chart of a method 100 of choosing a selective call transmitter among a plurality of selective call transmitter in accordance with the present invention. At step 102, a plurality of inputs are identified for use in a choosing a selective call transmitter including inputs for priority, latency, among others. At step 104, contiguous logic sets are defined or created for each of the inputs identified. At step 106, a contiguous logic set for the desired output is created. Then, at step 108, rules are defined relating the contiguous logic sets for each input with the contiguous logic set for the desired output. At step 110, statistics are maintained based on information received from the inputs. The rules are executed at step 112 when a choice of one of the plurality of selective call transmitter is required based on the statistics maintained. Finally, at step 114 the selective call transmitter is selected with the highest recommendation as determined by the rules. As a consequence, at step 116, information is transmitted using the selective call transmitter selected to have the highest recommendation. Optionally, the method 100 could further comprise the step 118 of modifying the relationships between the contiguous logic sets for each input and the contiguous logic set for the desired output by defining an inference engine using a linguistic rule base.

Figure 17:
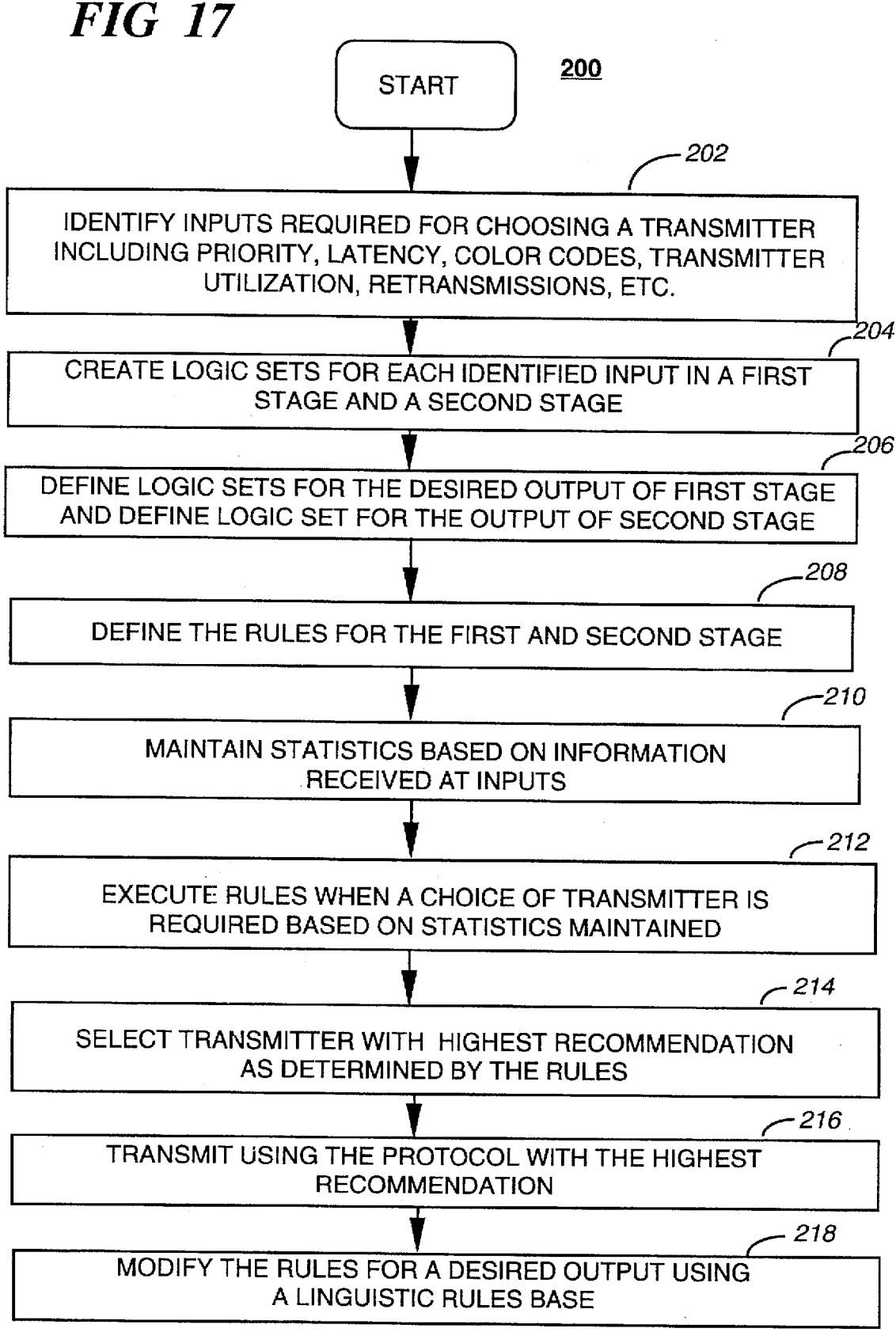
FIG. 17 is another flow chart of a method of choosing a selective call transmitter in accordance with the present invention.

FIG. 17 illustrates a flow chart of a method 200 of choosing a selective call transmitter among a plurality of selective call transmitters in accordance with another embodiment of the present invention. At step 202, a plurality of inputs are identified for use in choosing a selective call transmitter including inputs for priority, latency, among others. At step 204, contiguous logic sets are defined or created for each of the inputs identified in a first stage and a second stage. At step 206, contiguous logic sets for the desired outputs from a first stage is defined as well as for a contiguous logic set for a desired output from the second stage. Then, at step 208, rules are defined relating the contiguous logic sets for each input with the contiguous logic set for the desired output. At step 210, statistics are maintained based on information received from the inputs. The rules are executed at step 212 when a choice of one of the plurality of selective call transmitters is required based on the statistics maintained. Finally, at step 214 the selective call transmitter is selected with the highest recommendation as determined by the rules. As a consequence, at step 216, information is transmitted using the selective call transmitter selected to have the highest recommendation. Optionally, the method 200 could further comprise the step 218 of modifying the relationships between the contiguous logic sets for each input and the contiguous logic set for the desired output by defining an inference engine using a linguistic rule base.

The advantages of the approaches above are many. Using contiguous logic can account for many if not all the concerns regarding the selection of a particular transmitter. New rules can be added rapidly, since the decision factors are mostly of a parallel calculating nature. Transitions from one scenario to another is gradual rather than abrupt. Further, this prevents one goal or factor from completely dominating another excessively, when a partial bias will balance the system in a reasonable manner.

If desired, additional factors can be added to the consideration by defining similar rules, which linguistically change the existing ones. Finally, the system manager can be given control over the weights of the rules. This allows flexibility in biasing the system's operation, while minimizing the possibility of totally disrupting the system.

In summary the present invention preferably uses contiguous logic to define the decision making variables, wherein there can be consideration of all the variables affecting the decision process at all times. A customer such as a service provider can access, define, or refine weights which allow biasing of the decision making process, without leading to undesirable operating characteristics. Finally use of linguistic rules can be used to determine the near optimum decision.

What is claimed is:

1. An apparatus for choosing a selective call transmitter among a plurality of selective call transmitters for use in the transmission of selective call messages, the apparatus comprising:

a memory for storing historical data on transmissions previously sent for at least one of the plurality of selective call transmitters;

a memory for storing a plurality of pending messages, each of the pending messages having current information comprising at least an associated priority for each of the pending messages;

a sorter for classifying the historical data and the current information so as to select an optimum transmitter among the plurality of selective call transmitters available for the next transmission of the selective call messages, wherein the sorter classifies transmitters using a multistage contiguous logic operation having at least a first stage having at least a first fuzzifier, at least a first rule base, and at least a first defuzzifier for providing at least a first set of outputs as inputs for at least another stage of contiguous logic operation, wherein the at least another stage of contiguous logic operation provides an output for an optimum transmitter recommendation.

2. The apparatus as set forth in claim 1, wherein the historical data for each selective call transmitter comprises values selected from the group consisting of color code transmitter isolation, receiver transmitter isolation, page latency, page priority, transmitter utilization, and transmitters blocking.

3. The apparatus as set forth in claim 1, wherein the sorter alternatively selects a second optimum transmitter for the next transmission of the selective call messages if the optimum transmitter is not available.

4. The apparatus as set forth in claim 1, wherein the apparatus further comprises a plurality of processing elements including an input processing element for receiving bias settings, an output processing element for outputting the optimum transmitter identified, and an intermediate processing element for coupling the input processing element with the output processing element.

5. The apparatus of claim 1, wherein the sorter classifies transmitters using a two stage contiguous logic operation, a first stage having a first fuzzifier, a first rule base, and first defuzzifier for providing a first set of outputs as inputs for a second stage, wherein the second stage has a second fuzzifier, a second rule base and a second defuzzifier for providing an output for an optimum transmitter recommendation.

6. The apparatus as set forth in claim 1, wherein the sorter classifies the transmitters using contiguous logic.

7. The apparatus of claim 6, wherein the sorter comprises a fuzzifier for generating membership values for historical and current input conditions and a rule base for applying a set of predetermined rules to the current input conditions to perform a mapping with the historical conditions.

8. The apparatus of claim 7 wherein the sorter further comprises a defuzzifier for generating a non-fuzzy prediction recommendation from the mapping, and for generating the optimum transmitter and alternatively, for generating the second optimum transmitter.

9. The apparatus as set forth in claim 7, wherein the sorter further comprises an operator to modify the rule base for a fuzzy logic rules engine and a limiter to prevent such modifications from causing safe guarded situations to be exceeded.

10. The apparatus as set forth in claim 9, wherein a linguistic input is used to modify the relationships defining a inference engine operation associated with the rule base for the fuzzy logic rules engine.

11. An radio frequency manager for choosing a selective call transmitter among a plurality of selective call transmitters for use in the transmission of selective call messages, the apparatus comprising:

a memory for storing historical data on messages previously sent, the historical data being selected from the group consisting of color code transmitter isolation, page latency, page priority, and transmitter utilization;

a memory for storing a plurality of pending messages, each of the pending messages having current information comprising at least an associated priority for each of the pending messages;

a sorter for classifying the historical data and the current information serving as inputs using fuzzy logic so as to select an optimum transmitter among the plurality of selective call transmitters available for the next transmission of the selective call messages, wherein the sorter comprises a fuzzifier for generating membership values for historical and current input conditions, a rule base for applying a set of predetermined rules to the current input conditions to perform a mapping with the historical conditions, and a defuzzifier for generating a non-fuzzy prediction recommendation from the mapping for recommending an optimum transmitter;

a plurality of processing elements including an input processing element for receiving bias settings for the inputs;

an output processing element for outputting the optimum transmitter identified; and an intermediate processing element for coupling the input processing element with the output processing element.

12. The apparatus as set forth in claim 11, wherein the sorter further comprises an operator to modify the rule base for a fuzzy logic rules engine and a limiter to prevent such modifications from causing safe guarded situations to be exceeded.

13. The apparatus as set forth in claim 12, wherein a linguistic input is used to modify the relationships defining a inference engine operation associated with the rule base for the fuzzy logic rules engine.

14. An method for choosing a selective call transmitter among a plurality of selective call transmitters for use in the transmission of a plurality of selective call messages, comprising the steps of:

a) identifying a plurality of inputs for use in a choosing a selective call transmitter wherein such inputs are selected from the group consisting of color code transmitter isolation, page latency page priority and transmitter utilization;

b) defining contiguous logic sets for each of the inputs identified;

c) defining a contiguous logic set for the desired output;

d) defining rules relating the contiguous logic sets for each input with the contiguous logic set for the desired output;

e) maintaining statistics based on information received from the inputs;

f) executing the rules when a choice of one of the plurality of selective call transmitters is required based on the statistics maintained; and g) selecting the selective call transmitter with the highest recommendation as determined by the rules.

15. The method for choosing a selective call transmitter of claim 14, wherein the method further comprises the step of h) transmitting information using the selective call transmitter selected to have the highest recommendation.

16. The method of claim 14, wherein the step of identifying a plurality of inputs further includes the step of identifying inputs selected from the group consisting of color code transmitter isolation, receiver transmitter isolation, page latency, page priority, transmitter utilization, and transmitters blocking.

17. The method of claim 14, wherein the step of identifying a plurality of inputs further includes the step of identifying a subscriber unit battery savings measurement.

18. The method of claim 14, wherein the step of defining rules comprises the step of modifying the relationships between the contiguous logic sets for each input and the contiguous logic set for the desired output by defining an inference engine using a linguistic rule base.

* * * * *